US009538047B2

(12) United States Patent
Muramoto

(10) Patent No.: US 9,538,047 B2
(45) Date of Patent: Jan. 3, 2017

(54) IMAGE PROCESSING APPARATUS THAT ENSURES MONOCHROME OUTPUT ON COLOR DOCUMENT INCLUDING FLUORESCENT COLOR WHILE MAINTAINING READING OPERATION SPEED AND IMAGE PROCESSING SPEED, IMAGE PROCESSING METHOD, IMAGE FORMING APPARATUS, AND RECORDING MEDIUM

(71) Applicant: KYOCERA Document Solutions Inc., Osaka (JP)

(72) Inventor: Hideya Muramoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/946,128

(22) Filed: Nov. 19, 2015

(65) Prior Publication Data

US 2016/0156813 A1 Jun. 2, 2016

(30) Foreign Application Priority Data

Nov. 28, 2014 (JP) .................................. 2014-241171

(51) Int. Cl.
*H04N 1/40* (2006.01)
*H04N 1/60* (2006.01)
*H04N 1/407* (2006.01)
*H04N 1/00* (2006.01)

(52) U.S. Cl.
CPC ........ *H04N 1/6094* (2013.01); *H04N 1/00803* (2013.01); *H04N 1/4074* (2013.01); *H04N 1/40012* (2013.01); *H04N 1/40062* (2013.01); *H04N 1/40093* (2013.01); *H04N 2201/0094* (2013.01)

(58) Field of Classification Search
CPC combination set(s) only.
See application file for complete search history.

(56) References Cited

U.S. PATENT DOCUMENTS

2010/0245952 A1    9/2010   Muraishi ................ 358/505

FOREIGN PATENT DOCUMENTS

| JP | H 7-264409 A | 10/1995 |
|---|---|---|
| JP | H 11-88669 A | 3/1999 |
| JP | 2002-232709 A | 8/2002 |
| JP | 2010-226529 A | 10/2010 |

*Primary Examiner* — Barbara Reinier
(74) *Attorney, Agent, or Firm* — Stein IP, LLC

(57) ABSTRACT

An image processing apparatus includes a single-color image reading circuit and a fluorescent color area extracting circuit. The single-color image reading circuit reads an image on a document to create single-color image data. The fluorescent color area extracting circuit extracts a fluorescent color area included in the single-color image data based on pixel values of respective pixels constituting the single-color image data created by the single-color image reading circuit.

7 Claims, 7 Drawing Sheets

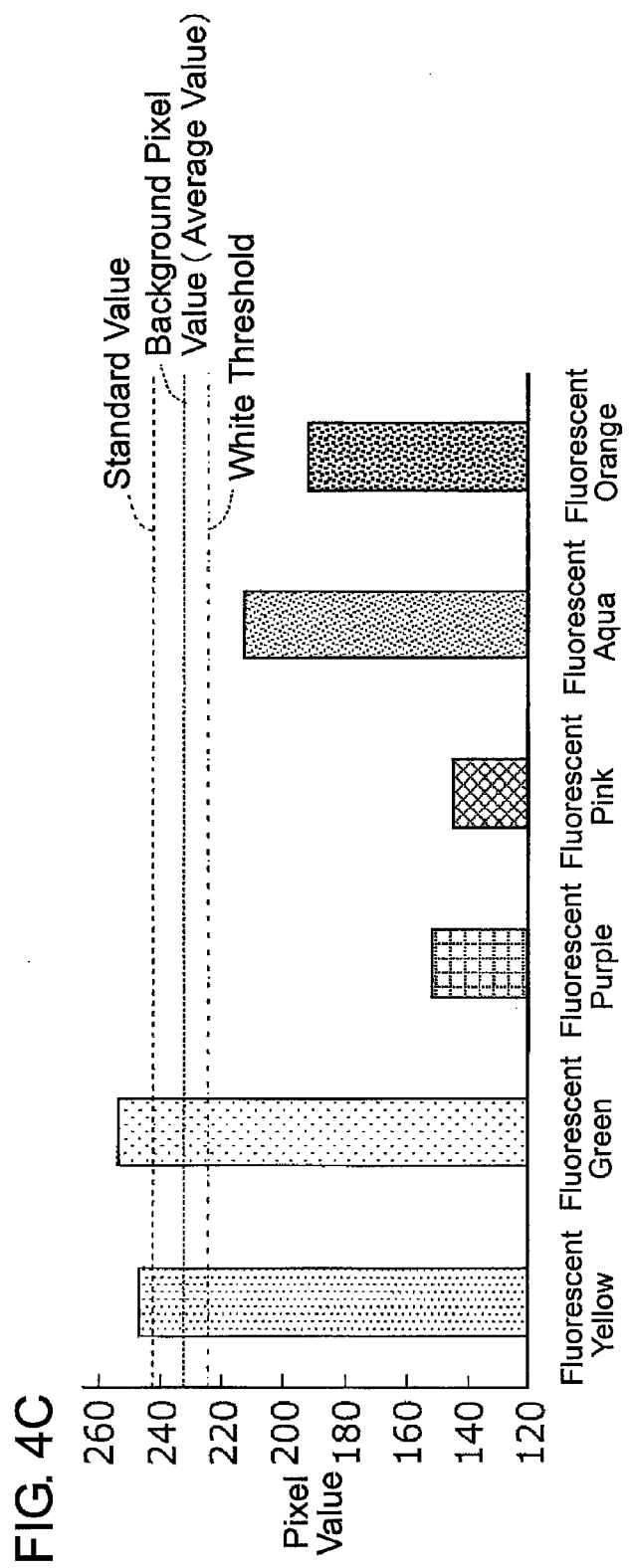

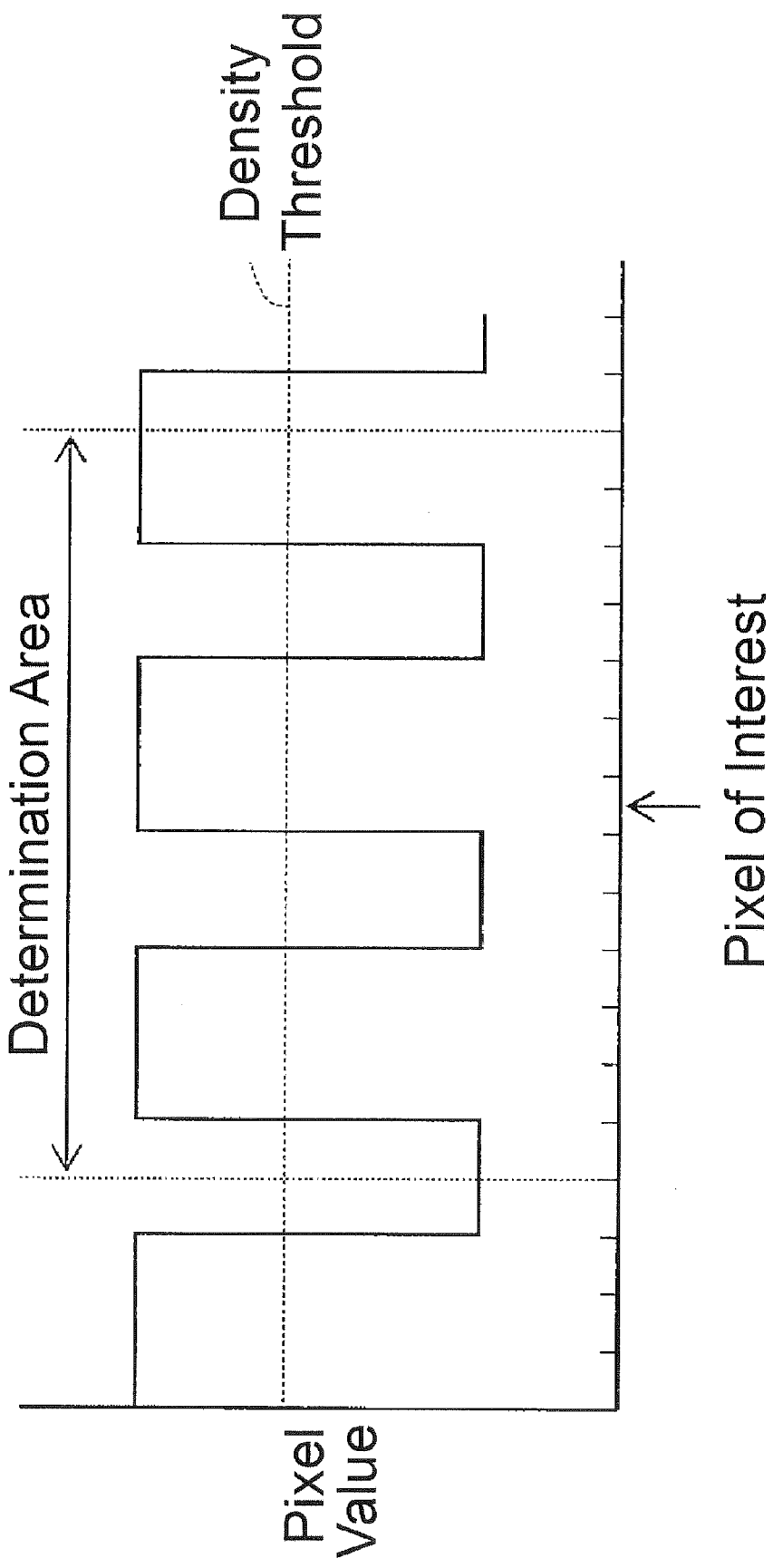

IMAGE PROCESSING APPARATUS THAT ENSURES MONOCHROME OUTPUT ON COLOR DOCUMENT INCLUDING FLUORESCENT COLOR WHILE MAINTAINING READING OPERATION SPEED AND IMAGE PROCESSING SPEED, IMAGE PROCESSING METHOD, IMAGE FORMING APPARATUS, AND RECORDING MEDIUM

INCORPORATION BY REFERENCE

This application is based upon, and claims the benefit of priority from, corresponding Japanese Patent Application No. 2014-241171 filed in the Japan Patent Office on Nov. 28, 2014, the entire contents of which are incorporated herein by reference.

BACKGROUND

Unless otherwise indicated herein, the description in this section is not prior art to the claims in this application and is not admitted to be prior art by inclusion in this section.

An image processing apparatus, such as a scanner, copier, and a multi-functional peripheral, includes an image reading sensor to obtain images on documents. There has been proposed an image processing apparatus that includes an RGB color sensor and a BW monochrome sensor as the image reading sensors. Such image processing apparatus, for example, uses not the RGB color sensor but the BW monochrome sensor for monochrome output to achieve high-speed reading operation and high-speed image processing.

However, for example, when reading a color document including a fluorescent color, such as a highlighter with a monochrome sensor, some pieces of information in blue and red bands are lost. As a result, tone reproducibility is degraded in some cases.

An image processing apparatus that allows a selection of reading images with any of the RGB color sensor and the BW monochrome sensor for monochrome output, is known. With this image processing apparatus, a user can freely select the reading with the RGB color sensor, which ensures high tone reproducibility (The image quality is prioritized.), or the reading with the BW monochrome sensor, which prioritizes the speed.

SUMMARY

An image processing apparatus according to one aspect of the disclosure includes a single-color image reading circuit and a fluorescent color area extracting circuit. The single-color image reading circuit reads an image on a document to create single-color image data. The fluorescent color area extracting circuit extracts a fluorescent color area included in the single-color image data based on pixel values of respective pixels constituting the single-color image data created by the single-color image reading circuit.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIGS. 4A to 4C schematically illustrate a fluorescent color area extracting method performed by the multi-functional peripheral of one embodiment;

FIGS. 5A to 5C schematically illustrate a halftone dot area determining method performed by the multi-functional peripheral of one embodiment.

DETAILED DESCRIPTION

Figure 1:
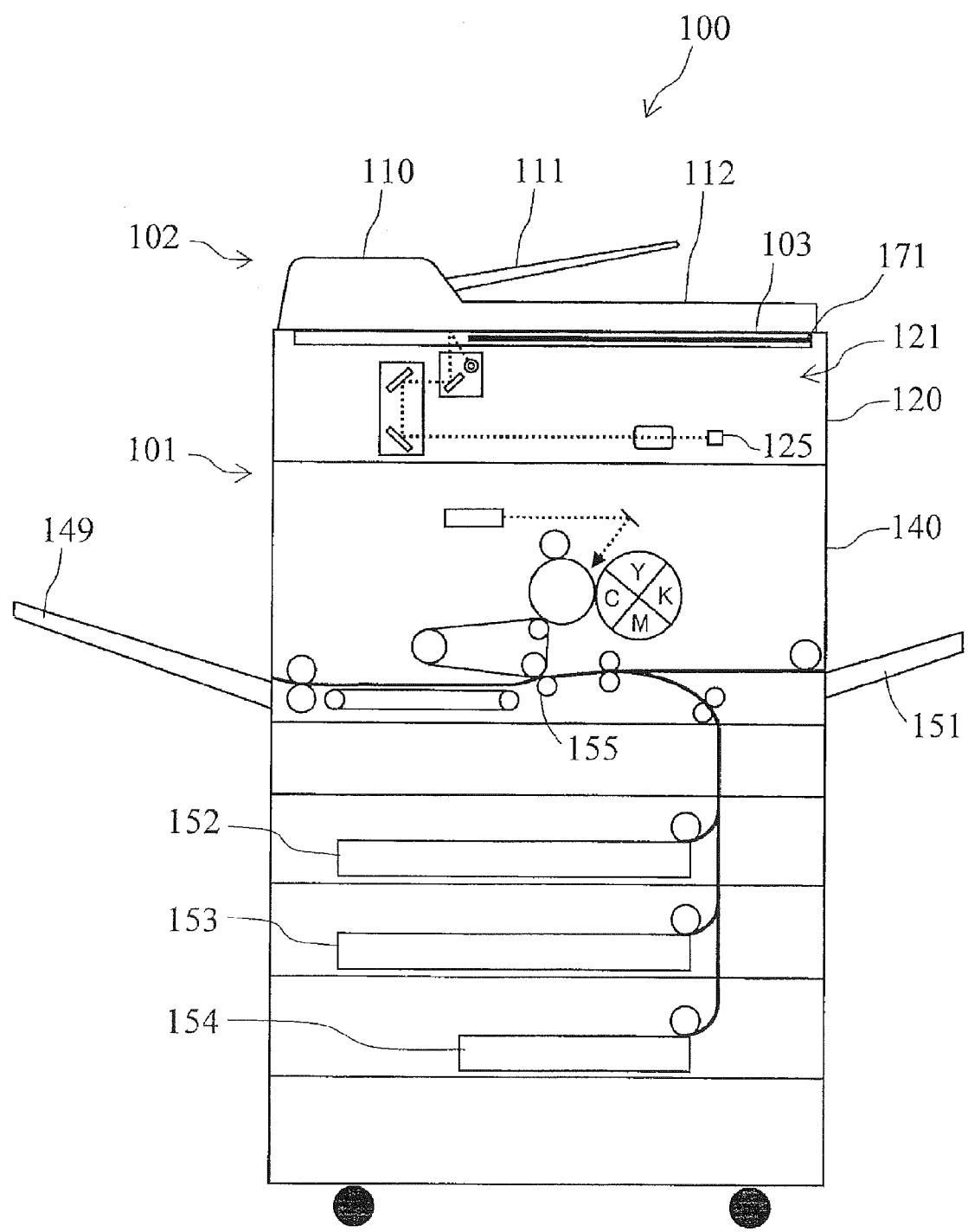
FIG. 1 schematically illustrates an overall configuration of a multi-functional peripheral of one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes one embodiment of the disclosure in further detail with reference to the drawings. The following embodies the disclosure as a digital multi-functional peripheral.

FIG. 1 is a schematic configuration diagram illustrating one example of an overall configuration of the digital multi-functional peripheral of the embodiment. As illustrated in FIG. 1, a multi-functional peripheral 100 includes a main body 101 and a platen cover 102. The main body 101 includes an image reading unit 120 (also referred to as an image reading circuit) and an image forming unit 140. The platen cover 102 is mounted over the main body 101. On the top surface of the main body 101, a platen 103, which is formed of a transparent plate such as a contact glass, is located. The platen 103 is opened and closed with the platen cover 102. The platen cover 102 includes a document conveying device 110, a document tray 111, and a sheet discharge tray 112. On the front face of the multi-functional peripheral 100, an operation panel 171 is located. With the operation panel 171, a user can give an instruction to start copying and other instructions to the multi-functional peripheral 100 and check the state and the settings of the multi-functional peripheral 100.

The image reading unit 120 is located under the platen 103. The image reading unit 120 reads images on documents with a scanning optical system 121 to create digital data (image data) of the images. A line image sensor 125 includes an RGB color sensor and a BW monochrome sensor. The RGB color sensor creates image data of documents corresponding to respective colors of R (red), G (green), and B (blue) from an optical image entered to a light receiving surface. The BW monochrome sensor creates image data in grayscale (black and white shading) from the optical image, which has entered to the light receiving surface.

The document is placed on the platen 103 or the document tray 111. The document conveying device 110 conveys the documents set to the document tray 111 to an image reading position one by one. When the document passes through the image reading position, the line image sensor 125 reads the images on the document. The document that has passed the image reading position is discharged to the sheet discharge tray 112.

The image forming unit 140 prints the created image data to a paper sheet, which is a transferred body. The created image data can also be transmitted to another apparatus through a network via a network interface (not illustrated) or a similar interface.

The image forming unit 140 prints the image data created by the image reading unit 120 and the image data received from the other apparatus through the network (not illustrated) on the paper sheet. The image forming unit 140 feeds the paper sheets from a manual tray 151, sheet feed cassettes 152, 153, and 154, or a similar device to a transfer unit 155, which transfers toner images. The paper sheet on which the toner images have been transferred by the transfer unit 155 is discharged to a sheet discharge tray 149.

Figure 2:
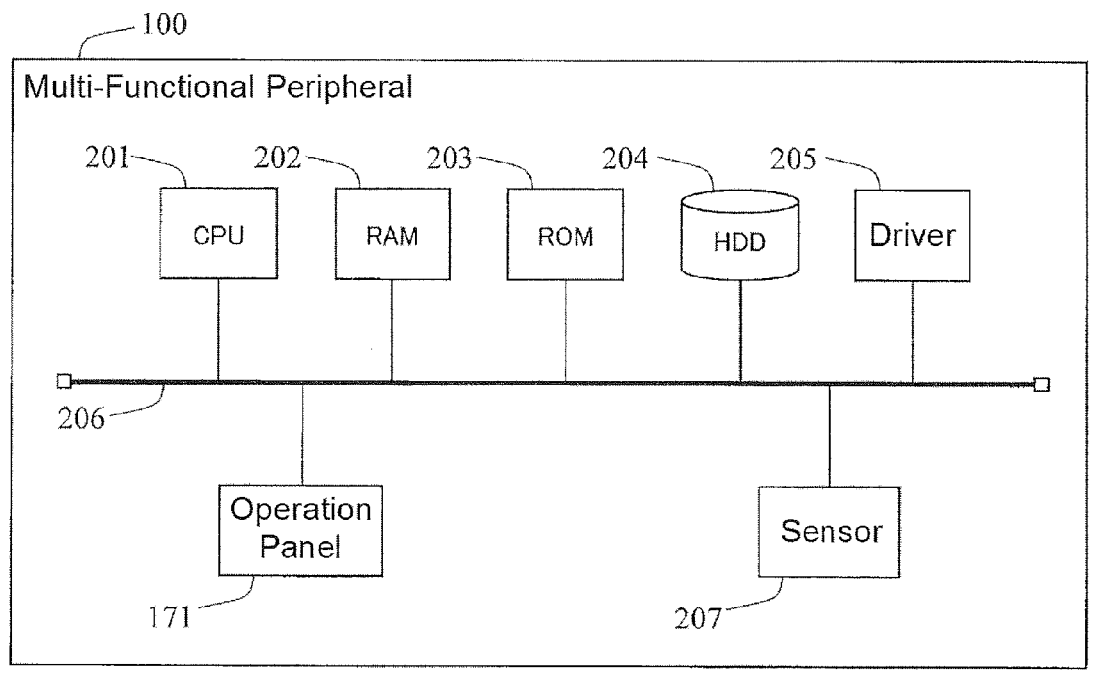
FIG. 2 illustrates a hardware configuration of the multi-functional peripheral of one embodiment.

FIG. 2 is a hardware configuration view of a control system in the multi-functional peripheral. In the multi-functional peripheral 100 of the embodiment, a driver 205 that handles respective driving units of a Central Processing Unit (CPU) 201, a Random Access Memory (RAM) 202, a Read Only Memory (ROM) 203, a Hard Disk Drive (HDD) 204, the image reading unit 120, and the image forming unit 140 is connected via an internal bus 206. The ROM 203, the HDD 204, or a similar memory stores programs. The CPU 201 controls the multi-functional peripheral 100 following commands of the control programs. For example, the CPU 201 uses the RAM 202 as a work area to control operations of the respective driving units by receiving/transmitting data and instructions with the driver 205. The HDD 204 is also used to accumulate the image data obtained by the image reading unit 120 and the image data received from the other apparatus through the network.

To the internal bus 206, the operation panel 171 and various sensors 207 are also connected. The operation panel 171 accepts the user's operation and supplies a signal based on the operation to the CPU 201. The operation panel 171 displays an operation screen to an equipped touch panel display following a control signal from the CPU 201. The sensor 207 includes various sensors such as a detecting sensor for opening/closing the platen cover 102, a detecting sensor of a document on the platen, a temperature sensor for a fixing unit, and a detecting sensor for a conveyed paper sheet or document.

The CPU 201, for example, runs the programs stored in the ROM 203 to achieve the following respective units (function blocks) and a control of the operations of the respective units in response to the signals from these sensors.

Figure 3:
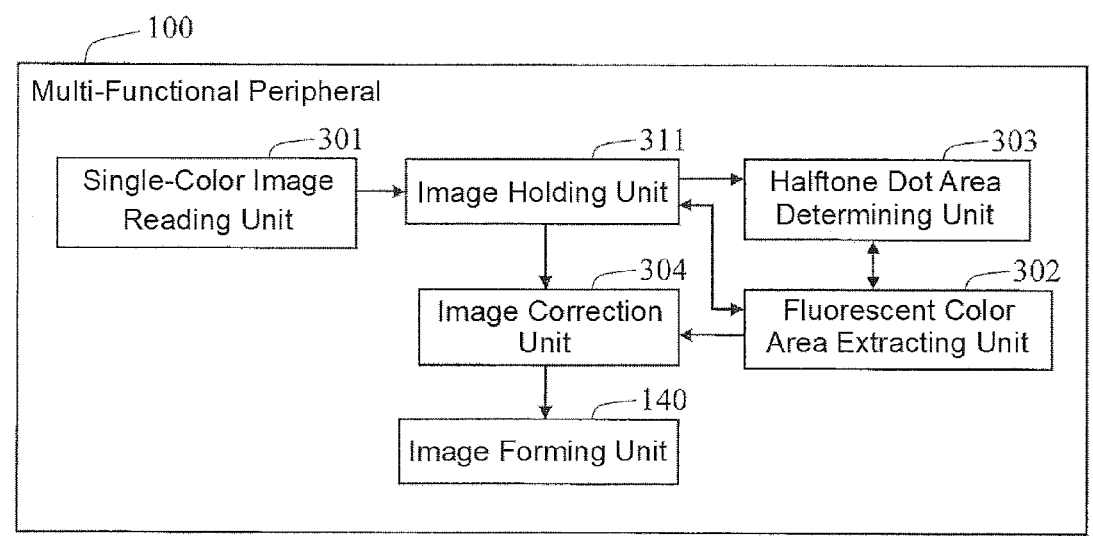
FIG. 3 illustrates the multi-functional peripheral of one embodiment.

FIG. 3 is a function block diagram of the multi-functional peripheral of the embodiment. As illustrated in FIG. 3, the multi-functional peripheral 100 includes a single-color image reading unit 301 (also referred to as a single-color image reading circuit) and a fluorescent color area extracting unit 302 (also referred to as a fluorescent color area extracting circuit).

The single-color image reading unit 301 reads images on documents to create single-color image data. In this embodiment, as described above, the BW monochrome sensor, which is included in the line image sensor 125, functions as the single-color image reading unit 301. It is only necessary that the single-color image reading unit 301 can create the single-color image data. The single-color image reading unit 301 is not necessary to create grayscale image data. For example, a configuration that includes only the RGB color sensor as the line image sensor also can use the single-color image reading unit 301 for only any one of colors of R, G, and B (for example, green).

The fluorescent color area extracting unit 302 extracts the fluorescent color area, which is included in the single-color image data, based on pixel values of respective pixels constituting the single-color image data created by the single-color image reading unit 301. In the embodiment, an image holding unit 311 temporarily holds the image data obtained by the single-color image reading unit 301 (the image reading unit 120). The fluorescent color area extracting unit 302 extracts the fluorescent color area included in the single-color image data based on the single-color image data held by the image holding unit 311. Here, the RAM 202 functions as the storage area of the image holding unit 311.

Although not specifically limited, in this embodiment, the fluorescent color area extracting unit 302 extracts the pixel with the pixel value equal to or more than a standard value as the fluorescent color area. The standard value is calculated by adding a predetermined value to a pixel value of a pixel corresponding to the background of the document.

Figure 4A:
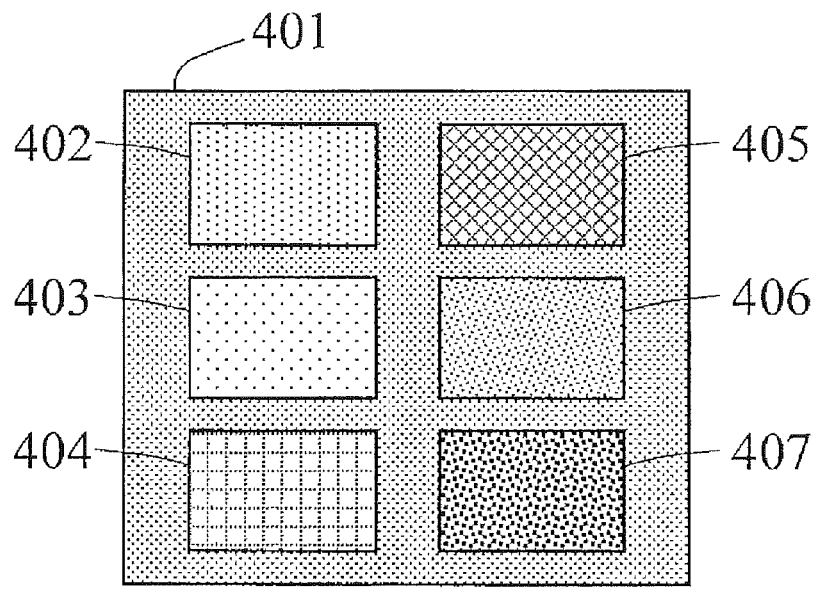
Figure 4B:
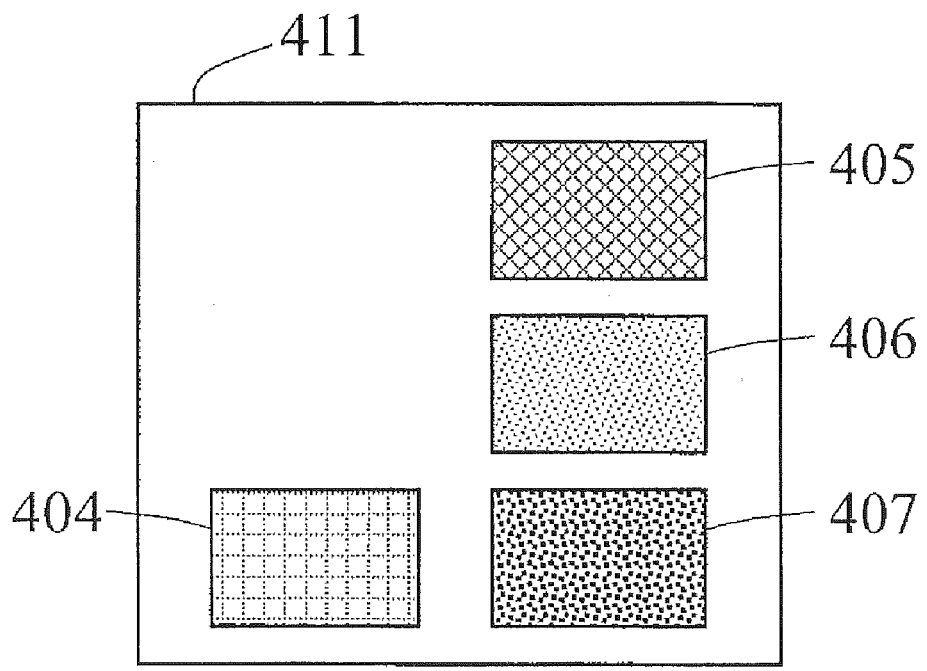

FIGS. 4A to 4C are schematic diagrams illustrating a fluorescent color area extracting method performed by the multi-functional peripheral 100. FIG. 4A schematically illustrates the single-color image data created by the single-color image reading unit 301. FIG. 4B is a schematic diagram illustrating image data input to the image forming unit 140 when performing the monochrome output on the single-color image data, which is illustrated in FIG. 4A, as it is by the multi-functional peripheral 100. FIG. 4C schematically illustrates the pixel values of the respective fluorescent colors illustrated in FIG. 4A. Here, the grayscale is expressed by 256 tones. The pixel value of black is 0, and the pixel value of white is 255.

FIG. 4A is the single-color image data created from the document including six-color fluorescent colors (fluorescent yellow, fluorescent green, fluorescent purple, fluorescent pink, fluorescent aqua, and fluorescent orange) by the single-color image reading unit 301. In FIG. 4A, a background 401 of the document includes rectangular areas 402 to 407. The rectangular areas 402 to 407 correspond to the respective fluorescent yellow, fluorescent green, fluorescent purple, fluorescent pink, fluorescent aqua, and fluorescent orange. As illustrated in FIG. 4C, the pixel value of the rectangular area 402, which corresponds to the fluorescent yellow, and the pixel value of the rectangular area 403, which corresponds to the fluorescent green, are larger than the pixel value of the background 401. That is, the rectangular area 402 and the rectangular area 403 are brighter (white) than the background 401.

In case where such image data is printed, the pixel values equal to or more than the predetermined white threshold, which is smaller than the pixel value of the background 401, in the single-color image data are all corrected to white (the pixel value: 255). Therefore, as illustrated in FIG. 4B, in the image data input to the image forming unit 140, the rectangular areas 402 and 403, which are illustrated in FIG. 4A, have the color identical to a corrected background 411 and are not printed on the paper sheet.

Meanwhile, considering the above-described situations, the extraction of the pixel areas brighter (white) than the background 401 in the single-color image data ensures extraction of the fluorescent color areas not printed on the paper sheet in the usual process. Therefore, in this embodiment, the fluorescent color area extracting unit 302 extracts the pixel having the pixel value larger than the standard value, which is a value determined by adding a margin value (for example, "10") to the average value of the pixel values of the background 401, in the single-color image data as the pixel included in the fluorescent color area. In the example of FIG. 4C, the fluorescent yellow and the fluorescent green have the pixel values larger than the standard value. Accordingly, in the example of FIG. 4A, the fluorescent color area extracting unit 302 extracts the rectangular area 402, which corresponds to the fluorescent yellow, and the rectangular area 403, which corresponds to the fluorescent green, as the fluorescent color areas.

Figure 5A:
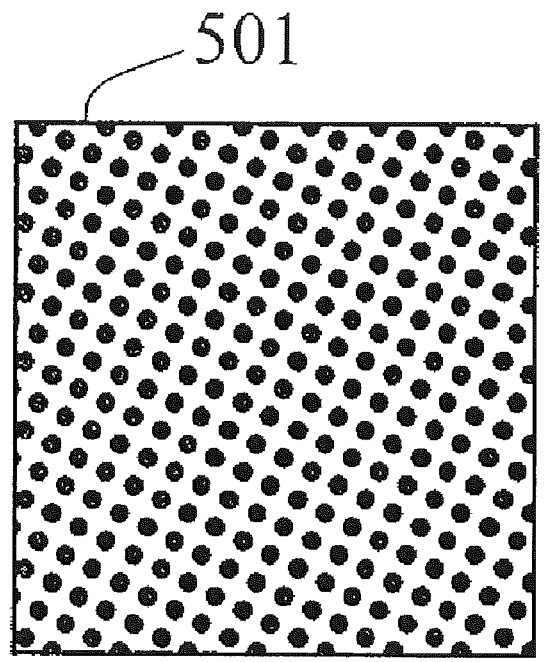

As already known, a method of halftone dots has been widely used for printed matters of grayscale images and color images. For example, as illustrated in FIG. 5A, in halftone dots 501 for grayscale, small, black dots are collocated on the background. Observing these halftone dots from a remote distance, the human eyes cannot identify the dots and recognizes the dots as gray. By the area ratio of the black dots to the background, the shading of the part can be determined. In the halftone dots for color images, by the area ratios between the background and the respective color dots of cyan, magenta, and yellow, the tint of the part can be determined.

In the above-described extraction of the fluorescent color area by the fluorescent color area extracting unit 302, when a halftone dot area expressing an extremely light tint is present on the document, this halftone dot area is extracted as the fluorescent color area in some cases. When the fluorescent color is given to the document by the highlighter or a similar method, the halftone dots like the printed matter are not present in this fluorescent color part. Therefore, the multi-functional peripheral 100 includes a halftone dot area determining unit 303 (also referred to as a halftone dot area determining circuit) as illustrated in FIG. 3. The halftone dot area determining unit 303 determines whether the pixel extracted by the fluorescent color area extracting unit 302 is in the halftone dot area or not.

The halftone dot area determining unit 303 determines whether a specific pixel belongs to the halftone dot area or not based on the pixel values of the respective pixels constituting the single-color image data, which is created by the single-color image reading unit 301. Then, the fluorescent color area extracting unit 302 removes the pixel determined as belonging to the halftone dot area by the halftone dot area determining unit 303 from the fluorescent color area. Although not specifically limited, in this embodiment, the halftone dot area determining unit 303 determines whether the specific pixel belongs to the halftone dot area or not based on the count of successive pixels and the count of density changes.

Figure 5B:
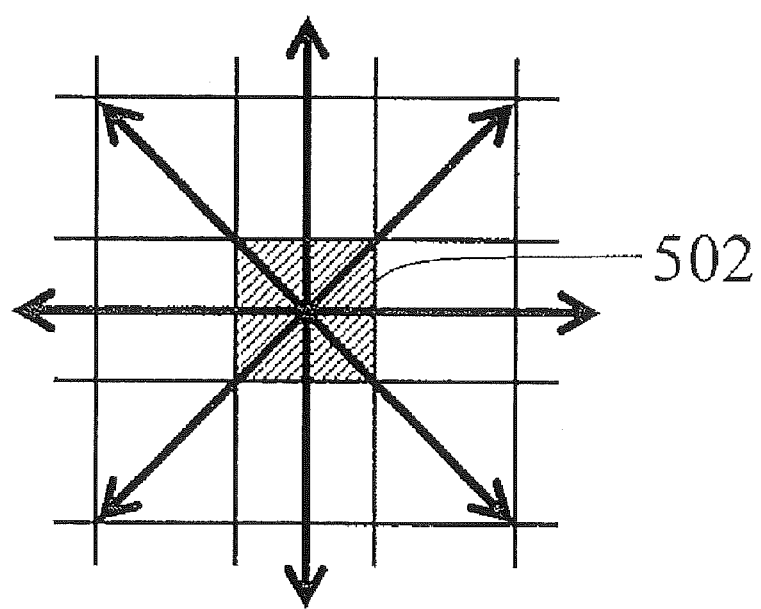

The count of successive pixels, for example, means a count of successively aligned pixels with the pixel values equal to or more than the above-described standard value in a determination area. The determination area is consisted of a pixel of interest (Here, a pixel determined as belonging to the fluorescent color area by the fluorescent color area extracting unit 302) and peripheral pixels in an area of m pixels×n pixels (for example, 13 pixels×13 pixels) around this pixel of interest. This count of successive pixels is, as illustrated in FIG. 5B, counted in four directions of the lateral direction, the vertical direction, and the oblique directions (direction of 45 degrees and 225 degrees and direction of 135 degrees and 315 degrees setting the right orientation as 0 degrees) basing a pixel of interest 502. For example, when the pixels having the pixel values equal to or more than the above-described standard value are successively present, four pixels to the right and two pixels to the left of the pixel of interest, the count of successive pixels in the lateral direction is "7." When the count of successive pixels is equal to or less than the predetermined threshold (for example, around 30% of a sequence of the count of pixels: here, "4"), the halftone dot area determining unit 303 determines that the pixel of interest belongs to the halftone dot area.

The count of density changes, for example, means the count of changes of the density (pixel value) across the predetermined density in the above-described sequence of pixels (13 pixels) arranged in the four directions in the determination area. The determination area is consisted of the pixel of interest and the peripheral pixels in an area of m pixels×n pixels (for example, 13 pixels×13 pixels) around this pixel of interest. For example, assume that the pixel values of the respective pixels aligned in a specific direction (for example, the lateral direction) from the pixel of interest in the single-color image data periodically change as illustrated in FIG. 5C. In this case, the count of density changes in the determination area (here, 13 pixels) on the pixel of interest illustrated in the drawing is "5." When the count of density changes is equal to or more than the predetermined threshold (for example, a proportion around 10 to 15% of the sequence of the count of pixels: here, "2"), the halftone dot area determining unit 303 determines that the pixel of interest belongs to the halftone dot area.

As described above, in this embodiment, when the count of successive pixels is equal to or less than the predetermined threshold or the count of density changes is equal to or more than the predetermined threshold, the halftone dot area determining unit 303 determines that the pixel of interest belongs to the halftone dot area.

The multi-functional peripheral 100 further includes an image correction unit 304 (also referred to as an image correction circuit). The image correction unit 304 performs image processing to enhance visibility on the fluorescent color area extracted by the fluorescent color area extracting unit 302. The processing to enhance the visibility is, for example, processing that offsets the pixel values to enhance the visibility of the pixels. As such processing, a change in gamma value, a change in pixel value level of the background, a change in the pixel value level of a target pixel, or a similar change can be used. When a gradation is employed among the peripheral pixels as the image processing in the image data obtained by the image reading unit 120, the processing to enhance the visibility also includes processing to reduce this gradation.

Figure 6:
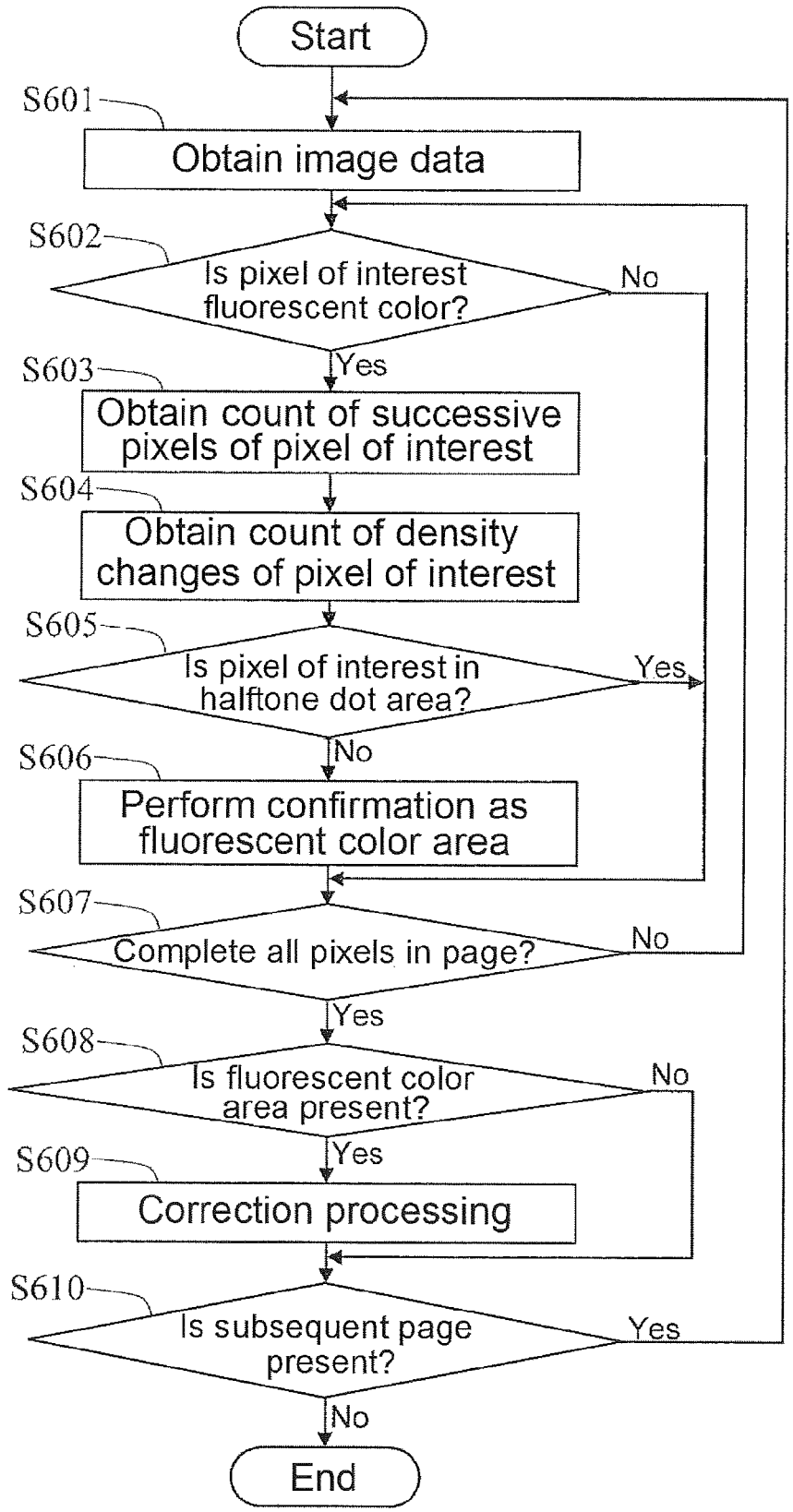
FIG. 6 illustrates an example of an image processing procedure performed by the multi-functional peripheral of one embodiment.

FIG. 6 is a flowchart showing an example of an image processing procedure performed by the multi-functional peripheral 100. This procedure starts, for example, an input of an acquisition instruction of monochrome image data by the user via the operation panel 171 as a trigger.

When this procedure starts, first, the user places the documents on the document tray 111. After that, the user presses a start button, which is provided with the operation panel 171, or performing a similar operation to instruct the acquisition of the single-color image data to the image reading unit 120 (the single-color image reading unit 301). In response to this instruction, the single-color image reading unit 301 obtains the single-color image data of the document, which is placed on the document tray 111, and causes the image holding unit 311 to store the single-color image data (Step S601).

After completion of the storage of the image data to the image holding unit 311 by the single-color image reading unit 301, the fluorescent color area extracting unit 302 starts extracting the fluorescent color area from the single-color image data stored in the image holding unit 311. Although not specifically limited, here, the fluorescent color area extracting unit 302 extracts the fluorescent color areas in units of pages.

The fluorescent color area extracting unit 302 compares the pixel value of the pixel constituting the single-color image data, which is stored in the image holding unit 311, with the above-described standard value. The fluorescent color area extracting unit 302 determines whether the pixel of interest (the determination target pixel) belongs to the fluorescent color area or not (Step S602). When the pixel of interest does not belong to the fluorescent color area, the fluorescent color area extracting unit 302 determines whether the subsequent pixel belongs to the fluorescent color area or not (No at Step S602 and No at S607).

Meanwhile, when the pixel of interest belongs to the fluorescent color area, the fluorescent color area extracting unit 302 inputs an information that the pixel of interest belongs to the fluorescent color area to the halftone dot area determining unit 303 together with an information identifying the pixel. In response to this input, the halftone dot area determining unit 303 obtains the count of successive pixels and the count of density changes of the input pixel of interest by the above-described method (Yes at Step S602 and then S603, and S604).

As described above, when the count of successive pixels is equal to or less than the predetermined threshold or the count of density changes is equal to or more than the predetermined threshold, the halftone dot area determining unit 303 determines that the pixel of interest belongs to the halftone dot area (Yes at Step S605). This determines result is notified to the fluorescent color area extracting unit 302. In this case, the fluorescent color area extracting unit 302 recognizes that this pixel of interest is the pixel not belonging to the fluorescent color area and determines whether the subsequent pixel belongs to the fluorescent color area or not (No at Step S607 and S602).

When the count of successive pixels is larger than the predetermined threshold and the count of density changes is less than the predetermined threshold, the halftone dot area determining unit 303 determines that the pixel of interest does not belong to the halftone dot area (No at Step S605). This determines result is notified to the fluorescent color area extracting unit 302. In this case, the fluorescent color area extracting unit 302 confirms that this pixel of interest is the pixel belonging to the fluorescent color area and determines whether the subsequent pixel belongs to the fluorescent color area or not (No at Steps S606 and S607, and S602).

After the above-described processing is performed on the all pixels included in one page, the fluorescent color area extracting unit 302 notifies the image correction unit 304 of the fluorescent color area specified in this page (Yes at Step S607 and Yes at Step S608). In response to this notification, the image correction unit 304 obtains the single-color image data in this page, which is stored in the image holding unit 311 and performs the above-described image processing to enhance the visibility on the notified pixel belonging to the fluorescent color area (Step S609). When the single-color image data, which is stored in the image holding unit 311, has the subsequent page, the image correction unit 304 performs the above-described processing on the subsequent page (Yes at Step S610). If the fluorescent color area extracting unit 302 does not identify the fluorescent color area in the page, the image correction unit 304 does not perform the image processing to enhance the visibility (No at Step S608).

After execution of the above-described processing to the all image data, which is stored in the image holding unit 311, the procedure is terminated (No at Step S610).

When the instruction input to the multi-functional peripheral 100 by the user includes a print instruction, the image forming unit 140 images the single-color image data on which the image processing has been performed by the image correction unit 304 on the paper sheet, which is the transferred body. When the instructions input to the multi-functional peripheral 100 by the user do not include the print instruction, a name specified by the user or similar characters is/are assigned to the single-color image data on which the image processing has been performed by the image correction unit 304. Then, the single-color image data is stored on the HDD 204. The user prints the single-color image data stored in the HDD 204 with the image forming unit 140 as necessary.

The embodiment exemplifies the multi-functional peripheral employing an electrophotographic method. However, the disclosure is also applicable to multi-functional peripherals employing an inkjet printing method.

The embodiment exemplifies the configuration where the halftone dot area determining unit 303 determines whether the specific pixel belongs to the halftone dot area or not based on the count of successive pixels and the count of density changes. However, the halftone dot area determining unit 303 may be a configuration that determines whether the specific pixel belongs to the halftone dot area or not by any one of the count of successive pixels and the count of density changes.

As described above, since the multi-functional peripheral 100 extracts the fluorescent color area based on the pixel values of the single-color image data, the disclosure does not reduce the reading operation speed and the image processing speed. The multi-functional peripheral 100 can excellently perform the monochrome output on the fluorescent colors. That is, the multi-functional peripheral 100 can achieve both the tone reproducibility and the processing speed. The user needs not to input instructions for the image processing in particular. Compared with the conventional cases, this allows the user to improve convenience for use.

The multi-functional peripheral 100 determines whether the pixels extracted as the fluorescent colors belong to the halftone dot area or not. This ensures extracting the fluorescent colors given on the document by the highlighter or a similar method with more certainty.

The above-described respective embodiments do not limit the technical scope of the disclosure. Various modifications and applications are possible within the scope of the disclosure in addition to the already-described embodiments. For example, as an especially preferable aspect, the embodiment describes the configuration that includes the halftone dot area determining unit 303. However, the halftone dot area determining unit 303 is not a component essential to the disclosure. The configuration may not include the halftone dot area determining unit 303. Even if the configuration includes the halftone dot area determining unit 303, a configuration where the user's instruction selectively employs the function can be employed.

The order of the respective steps in the flowchart shown in FIG. 6 can be appropriately changed within the scope achieving the equivalent effect. For example, the processing by the halftone dot area determining unit 303 (Steps S603, S604, and S605) may be performed on the all pixels. In addition, the processing may be concurrently performed with the processing by the fluorescent color area extracting unit 302 (Step S602).

Furthermore, the above-described embodiment embodies the disclosure as the digital multi-functional peripheral. However, the disclosure is not limited to the digital multi-functional peripheral. The disclosure can also be applied to any image processing apparatus with a monochrome image output function, such as a scanner and a copier.

According to the disclosure, the monochrome output can be excellently performed on the color document including the fluorescent colors without reduction of the reading operation speed and the image processing speed and also allows the user to improve convenience for use compared with the conventional cases. Therefore, the disclosure is effective as the image processing apparatus and the image forming apparatus.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image processing apparatus comprising:
   a single-color image reading circuit that reads an image on a document to create single-color image data;
   a fluorescent color area extracting circuit that extracts a fluorescent color area included in the single-color image data based on pixel values of respective pixels constituting the single-color image data created by the single-color image reading circuit; and
   a determining circuit that determines whether a specific pixel belongs to a halftone dot area or not based on the pixel values of respective pixels constituting the single-color image data, the single-color image data being created by the single-color image reading circuit,
   wherein the fluorescent color area extracting circuit removes the pixel determined as belonging to the halftone dot area by the determining circuit from the fluorescent color area.

2. The image processing apparatus according to claim 1, wherein the fluorescent color area extracting circuit extracts a pixel with a pixel value equal to or more than a standard value as the fluorescent color area, the standard value being calculated by adding a predetermined value to a pixel value of a pixel corresponding to a background of the document.

3. The image processing apparatus according to claim 1, wherein the determining circuit determines whether the specific pixel belongs to the halftone dot area or not based on a count of successive pixels or a count of density changes.

4. The image processing apparatus according to claim 1, further comprising
   an image correction circuit that performs image processing on a fluorescent color area extracted by the fluorescent color area extracting circuit, the image processing enhancing visibility.

5. An image forming apparatus comprising:
   the image processing apparatus according to claim 1;
   an image correction circuit that performs image processing on a fluorescent color area extracted by the fluorescent color area extracting circuit, the image processing enhancing visibility; and
   an image forming unit that images image data processed by the image correction circuit on a transferred body.

6. An image processing method comprising:
   reading an image on a document to create single-color image data;
   extracting a fluorescent color area included in the single-color image data based on pixel values of respective pixels constituting the single-color image data created by the reading; and
   determining whether a specific pixel belongs to a halftone dot area or not based on the pixel values of respective pixels constituting the single-color image data, the single-color image data being created by the reading,
   wherein the extracting removes the pixel determined as belonging to the halftone dot area by the determining from the fluorescent color area.

7. A non-transitory computer-readable recording medium storing an image processing program to control an image processing apparatus, the image processing program causing the image processing apparatus to function as:
   a single-color image reading circuit that reads an image on a document to create single-color image data;
   a fluorescent color area extracting circuit that extracts a fluorescent color area included in the single-color image data based on pixel values of respective pixels constituting the single-color image data created by the single-color image reading circuit; and
   a determining circuit that determines whether a specific pixel belongs to a halftone dot area or not based on the pixel values of respective pixels constituting the single-color image data, the single-color image data being created by the single-color image reading circuit,
   wherein the fluorescent color area extracting circuit removes the pixel determined as belonging to the halftone dot area by the determining circuit from the fluorescent color area.

* * * * *